United States Patent
Song et al.

(10) Patent No.: US 7,593,690 B2
(45) Date of Patent: Sep. 22, 2009

(54) SIGNAL CONVERTER, RFID TAG HAVING SIGNAL CONVERTER, AND METHOD OF DRIVING RFID TAG

(75) Inventors: Il-jong Song, Suwon-si (KR); Young-hun Min, Anyang-si (KR); Cheong-worl Kim, Andong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 11/589,218

(22) Filed: Oct. 30, 2006

(65) Prior Publication Data

US 2007/0176809 A1    Aug. 2, 2007

(30) Foreign Application Priority Data

Jan. 13, 2006    (KR) .............. 10-2006-0004091

(51) Int. Cl.
 *H04B 1/06* (2006.01)
(52) U.S. Cl. .................. 455/41.1; 455/106
(58) Field of Classification Search ............. 455/41.1, 455/41.2, 91, 106, 550.1, 574; 340/10.1, 340/10.3, 10.4; 342/42, 43, 50, 51
See application file for complete search history.

(56) References Cited

U.S. PATENT DOCUMENTS

| | | | | |
|---|---|---|---|---|
| 6,321,067 | B1 * | 11/2001 | Suga et al. | 455/41.2 |
| 6,498,923 | B2 * | 12/2002 | Ikefuji et al. | 455/41.1 |
| 2008/0174410 | A1 * | 7/2008 | Sarangapani et al. | 340/10.4 |

* cited by examiner

*Primary Examiner*—Thanh C Le
(74) *Attorney, Agent, or Firm*—Sughrue Mion, PLLC

(57) ABSTRACT

A signal converter capable of stabling converting input signals in an extended operation margin, a radio frequency identification (RFID) tag having the signal converter and a method of driving a RFID tag. The signal converter includes a first signal converter which converts an incoming analog signal into a power signal, a second signal converter which converts the analog signal into a first demodulation signal, a signal amplifier which amplifies the first demodulation signal to output a second demodulation signal such that a value of an externally-supplied reference signal is included in a peak-to-peak range of the second demodulation signal, and a logic signal generator which converts the second demodulation signal into a digital signal in response to the power signal. Because the second demodulation signal has an extended operation margin in converting analog signal into digital signal, stable conversion of the input signals is possible, and rate of recognizing RFID tag is improved.

16 Claims, 8 Drawing Sheets

SIGNAL CONVERTER, RFID TAG HAVING SIGNAL CONVERTER, AND METHOD OF DRIVING RFID TAG

CROSS-REFERENCE TO RELATED APPLICATIONS

This application claims priority from Korean Patent Application No. 10-2006-0004091, filed Jan. 13, 2006, in the Korean Intellectual Property Office, the disclosure of which is incorporated herein by reference.

BACKGROUND OF THE INVENTION

1. Field of the Invention

Methods and apparatuses consistent with the present invention relate to a signal converter, a radio frequency identification (RFID) tag having the same, and a method of driving the RFID. More particularly, methods and apparatuses consistent with the present invention relate to a signal converter which performs stable conversion of input signal by extending operational margin, an RFID tag having the signal converter and a method of driving the RFID tag.

2. Description of the Related Art

As computer technologies and image recognizing technologies develop, many information recognition technologies have been introduced, and information recognition using a barcode as a medium is widely used. However, as the barcode information recognition requires contacting a barcode reader to the barcode for information identification, and the barcode stores limited information, the barcode system has a limited range of applications.

Therefore, in order to make broader information recognition range possible, a contactless information recognition device and a device having a high capacity memory is required.

A radio frequency identification (RFID) tag using radio frequency draws attention as a device that can satisfy the above requirements.

In general, the RFID tag is used with an RFID reader, and there are active and passive type RFID tags according to types of power source. The active method drives the RFID tag by a battery to output stored tag data from the RFID tag. The passive method generates an induced current using a magnetic field by electric power energy output from the RFID reader, and uses voltage of the induced current as a driving power to output stored tag data from the RFID tag.

The RFID tag transmits and receives data to and from the RFID reader through an antenna. To this end, the RFID tag requires a signal converter which receives a data signal modulated as an analog format and demodulates the data signal as a digital format.

The performance of the signal converter depends on how exactly it can recover the data signal from the RFID reader. Additionally, a low-power consumption function is also required.

FIG. 7 is a circuit diagram illustrating a general RFID tag. More specifically, the RFID tag of FIG. 7 is a "A Low-Power CMOS Integrated Circuit for Field-Powered Radio Frequency Identification Tags" which was introduced in ISSCC97 SESSION17/PAPER17.5. FIG. 7 particularly shows a signal converter having a demodulation circuit.

Referring to FIG. 7, reader data R_data and a reader clock R_clk, which are output from an RFID reader (not shown), are transmitted to an antenna as an analog signal, and induced in the antenna as an alternating current (AC) signal. The induced AC signal is transmitted to a packet assembly and disassembly (PAD), which is connected to the antenna of the RFID tag. The AC signal transmitted to the PAD is rectified and smoothed by a first signal converter including a first diode D1, a second diode D2 and a first capacitor C1, to be converted into a power signal VDD of a direct current (DC) component.

The AC signal transmitted to the PAD is also rectified and smoothed by a second signal converter including a third diode D3, a fourth diode D4 and a second capacitor C2, to be converted into a first demodulation signal V_sig1 of a DC component.

The first capacitor C1 has the electrostatic capacitance higher than the second capacitor C2 so that the power signal VDD has the smoothing degree higher than the first demodulation signal V_sig1.

A first transistor Tr1 is formed for biasing or limiting currents.

It can be constructed that the first demodulation signal V_sig1 transmitted to a first node N1 is converted and output into a digital signal by a buffer Buf including an inverter and so on, which are serially connected to each other. Additionally, if a low frequency RF is used, the capacitance of the second capacitor C2 increases. If the capacitance of the second capacitor C2 increases, a discharge current grounded to a ground terminal GND through the first transistor Tr1 increases. In this case, by further including a signal detector including a second through fifth transistors Tr2-Tr5 and a third capacitor C3, it can be constructed that after the first demodulation signal V_sig1 transmitted to the first node N1 is detected and amplified to be converted into a second demodulation signal V_sig2, the second demodulation signal V_sig2 is transmitted to the buffer Buf.

As shown in FIG. 8, a conventional RFID tag having the above structure compares the first or second demodulation signal V_sig1 or V_sig2 transmitted to the buffer Buf, and a reference signal V_ref1 transmitted from the outside to generate a digital signal D_sig of logical value "0" or "1".

For example, if the first or second demodulation signal V_sig1 or V_sig2 transmitted to the buffer Buf has the electric potential level higher than the reference signal V_ref1, logical value "1" is generated. If the first or second demodulation signal V_sig1 or V_sig2 has the electric potential level lower than the reference signal V_ref1, logical value "0" is generated. This way, the input analog signal, and especially the reader data R_data which are input as the analog format, are converted and output into a digital signal D_sig.

When a data signal is converted according to the above method, as shown in FIG. 9, if the first or second demodulation signal V_sig1 or V_sig2 forms a peak-to-peak value across the reference signal V_ref1, logical value "0" or "1" can be calculated to convert into a digital signal D_sig. However, as shown in FIG. 10, if the first or second demodulation signal V_sig1 or V_sig2 forms a peak-to-peak value below or over the electric potential level of the reference signal V_ref1, an analog signal transmitted from the antenna, that is, the reader data R_data cannot be accurately converted into a digital signal D_sig using the reference signal V_ref1.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a signal converter, comprising: a first signal converter which converts an incoming analog signal into a power signal; a second signal converter which converts the analog signal into a first demodulation signal; a signal amplifier which amplifies the first demodulation signal to output a second demodulation signal such that a value of an externally-supplied reference signal is included in a peak-to-peak range of the second demodulation signal; and a logic signal generator which converts the second demodulation signal into a digital signal in response to the power signal.

The signal amplifier may comprise a differential amplifier. The signal amplifier may also comprise a second amplifier which increases an output gain of the differential amplifier.

A signal detector may also be provided, which detects and amplifies the first demodulation signal when the peak-to-peak range of the first demodulation signal is narrow. The signal amplifier may output the first demodulation signal, which is amplified at the signal detector, as a second demodulation signal.

An over-voltage preventive part may also be provided, which discharges the first demodulation signal to a ground terminal when the first demodulation signal outputted from the second signal converter is in an over-voltage exceeding a predetermined level. An impedance matching part may also be provided, which matches impedance with an output source of the analog signal.

The first signal converter may comprise a first rectifier which rectifies the analog signal; and a first smoothing circuit which converts by smoothing the rectified analog signal into the power signal.

The second signal converter may comprise: a second rectifier which rectifies the analog signal; and a second smoothing circuit which converts by smoothing the rectified analog signal into the first demodulation signal.

The first smoothing circuit may comprise a capacitor which has a capacitance relatively larger than that of the second smoothing circuit.

The logic signal generator may comprise buffers in series connection with a plurality of inverters.

The present invention also provides a radio frequency identification (RFID) tag, comprising: a first conversion circuit which converts a first incoming analog signal into a power signal and a demodulation signal, amplifies the demodulation signal such that a value of a predetermined reference signal is included in a peak-to-peak range of the demodulation signal, and outputs a digital signal using the amplified demodulation signal; a memory which stores tag data; a second conversion circuit which converts the tag data into a second analog signal and outputs the converted signal; and a controller which reads out tag data from the memory in response to the digital signal and controls the operation of the second conversion circuit in response to the read tag data.

The first conversion circuit may comprise: a first signal converter which converts the first analog signal into a power signal; a second signal converter which converts the first analog signal into a first demodulation signal; a signal amplifier which amplifies the first demodulation signal to output a second demodulation signal such that a value of an externally-supplied reference signal is included in a peak-to-peak range of the second demodulation signal; and a logic signal generator which converts the second demodulation signal into a digital signal in response to the power signal.

The second signal converter may comprise a modulation circuit which modulates the data signal into a second analog signal.

The present invention also provides a method of driving a radio frequency identification (RFID) tag, comprising: rectifying and smoothing a first incoming analog signal to generate a power signal and a first demodulation signal; amplifying the first demodulation signal to output a second demodulation signal such that a value of an externally-supplied reference signal is included in a peak-to-peak range of the second demodulation signal; and converting the second demodulation signal into a digital signal in response to the power signal.

Additionally, decoding and reading out pre-stored tag data in response to the digital signal; encoding the read tag data; and modulating the encoded tag data to output a second analog signal, may also be provided.

Accordingly, a rectified and smoothed analog signal is amplified in the demodulation of an analog signal such that a margin is improved for the reference signal, which is to convert analog signal into digital signal, to be included in a peak-to-peak range of the rectified and smoothed analog signal. As a result, stable conversion from analog signal into digital signal is provided, and the rate of recognition of RFID tag is also improved.

BRIEF DESCRIPTION OF THE DRAWING FIGURES

The above and other aspects and other features of embodiments of the present invention will become more apparent by describing in detail exemplary embodiments thereof with reference to the attached drawing figures, wherein.

Figure 3:
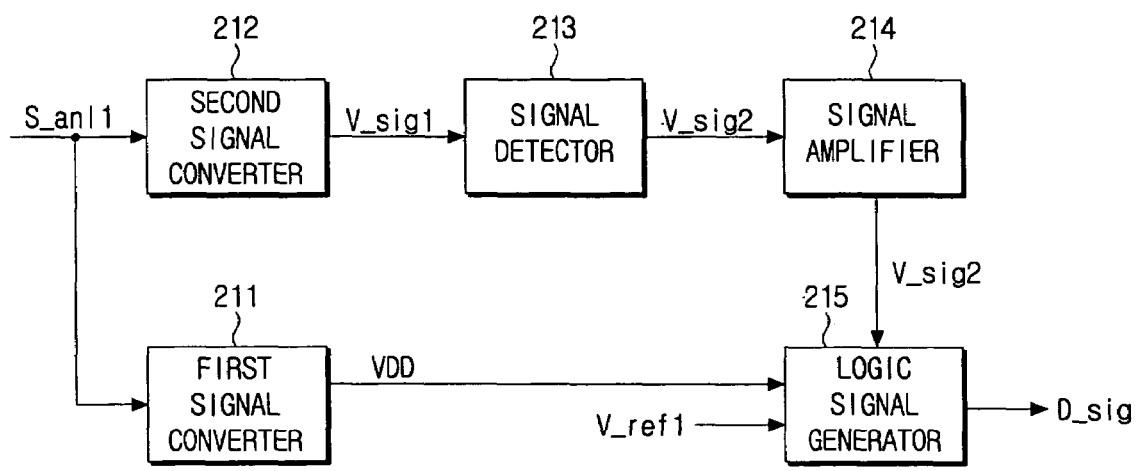
Figure 4:
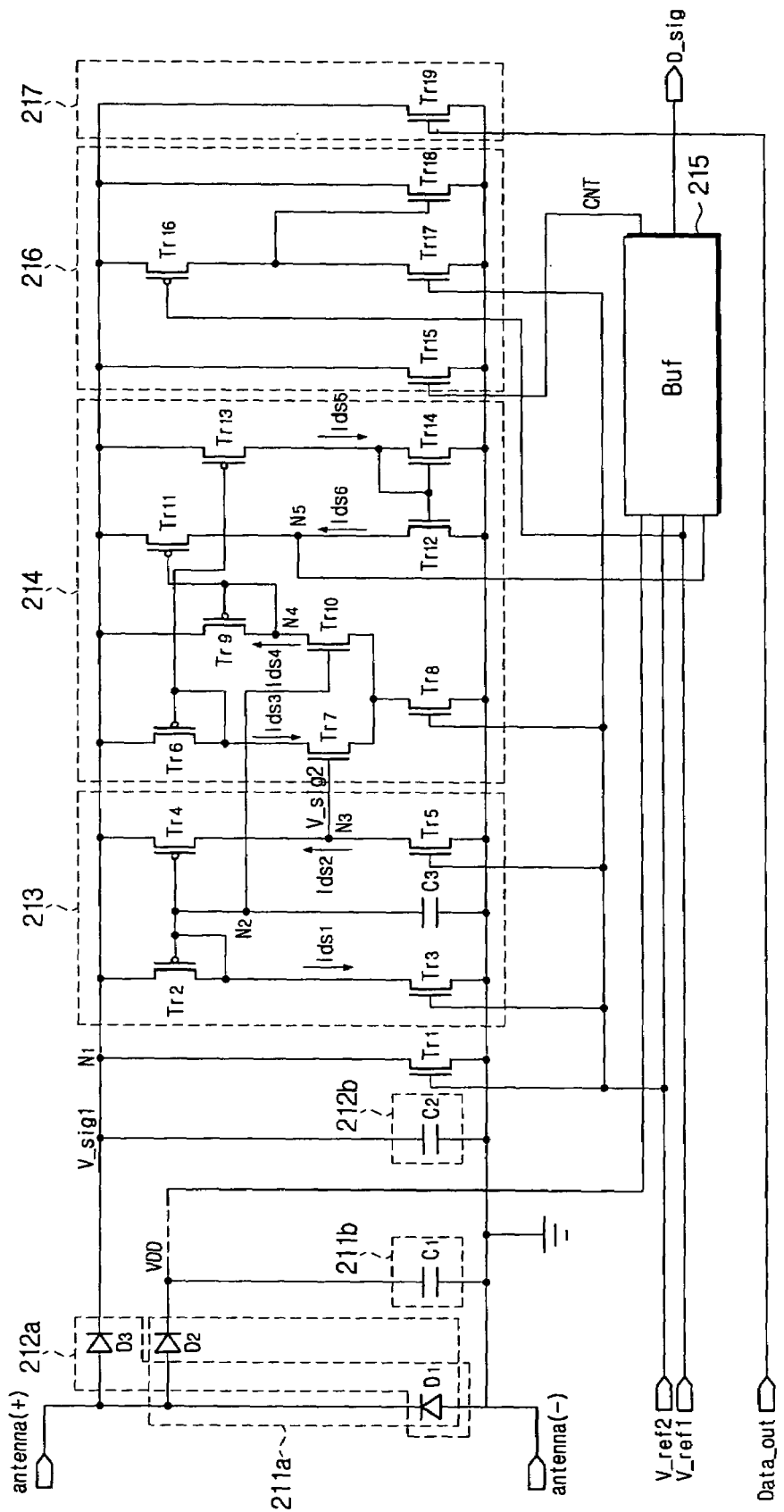
Figure 5:
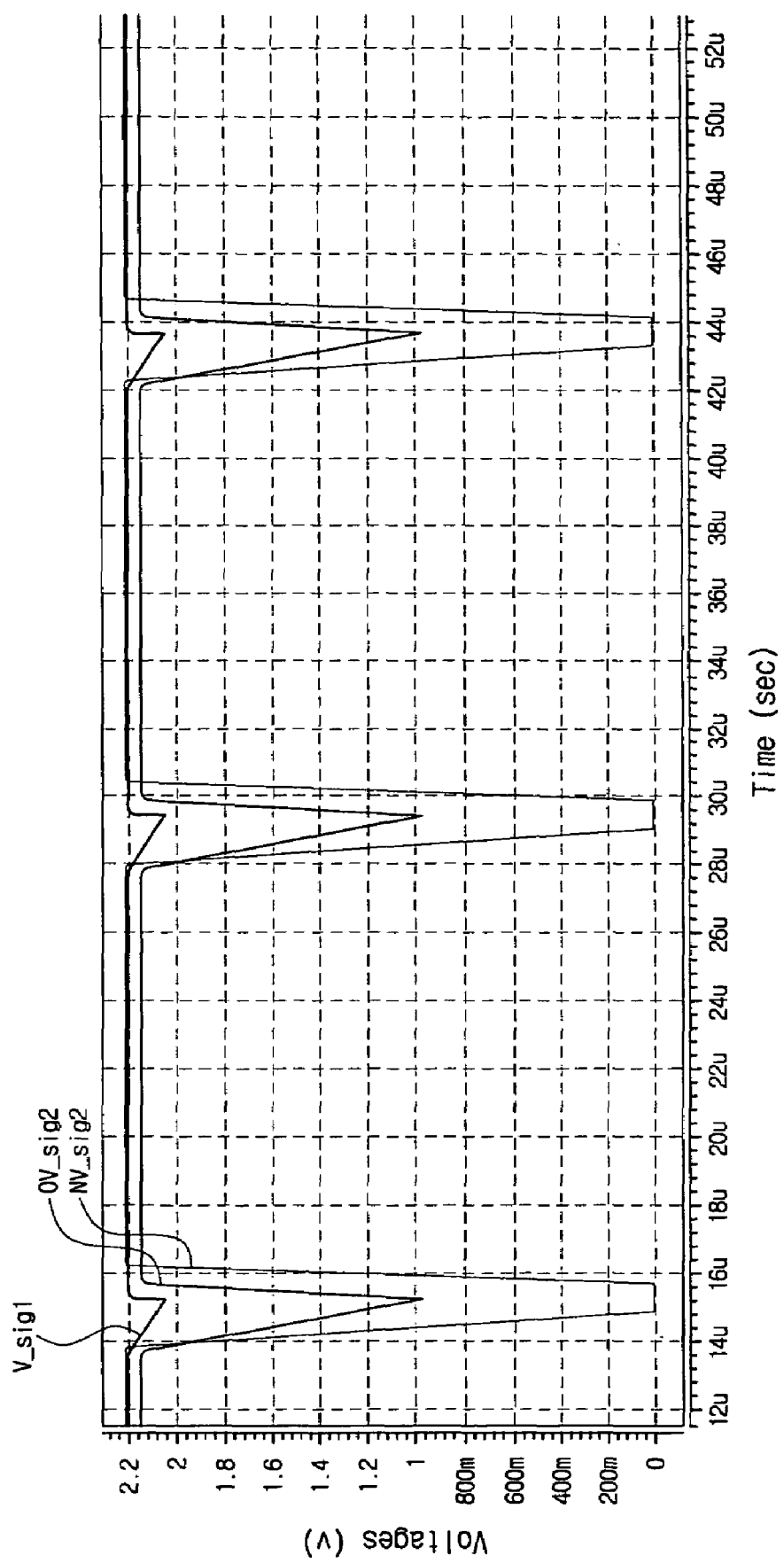
Figure 6:
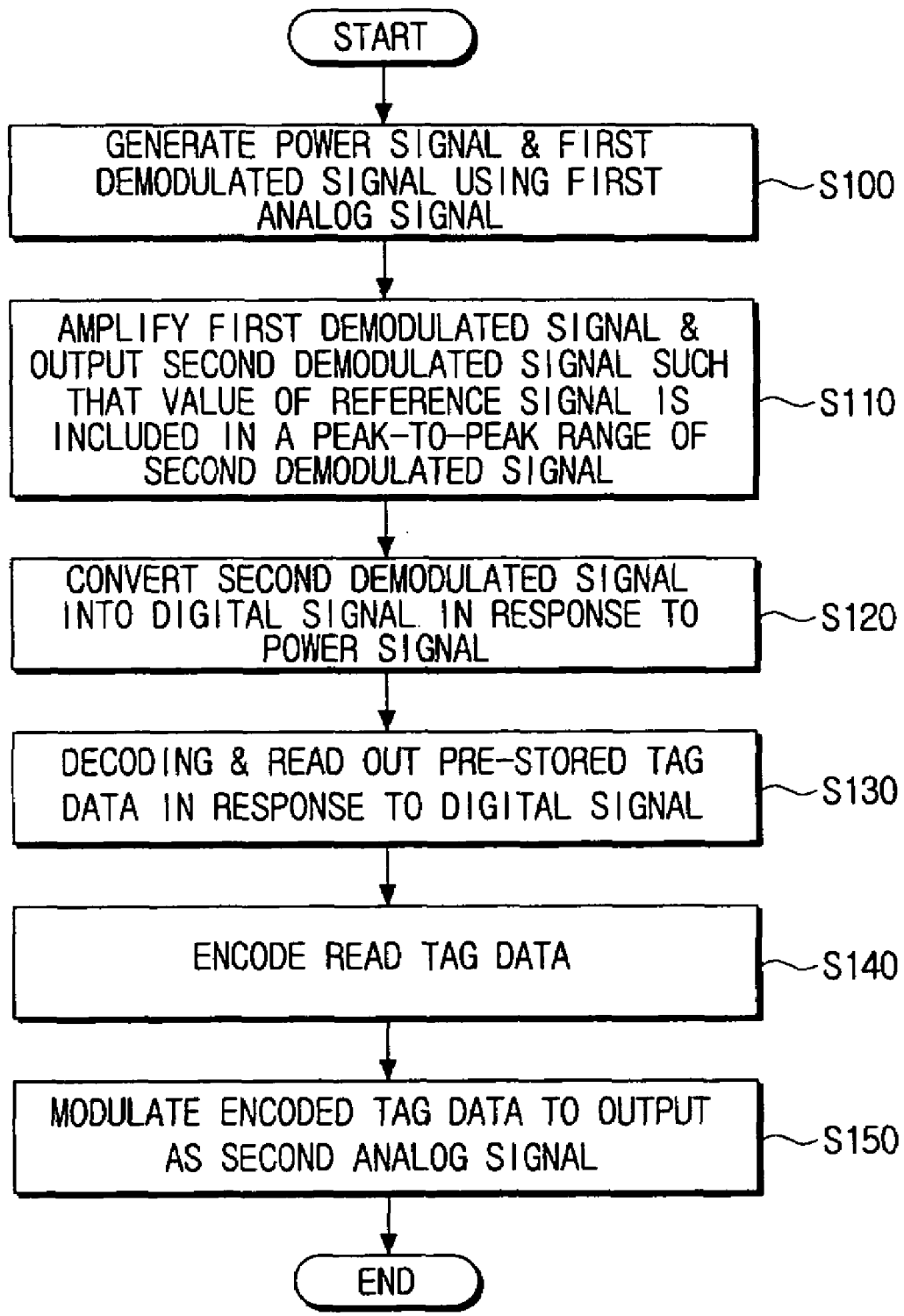
Figure 7:
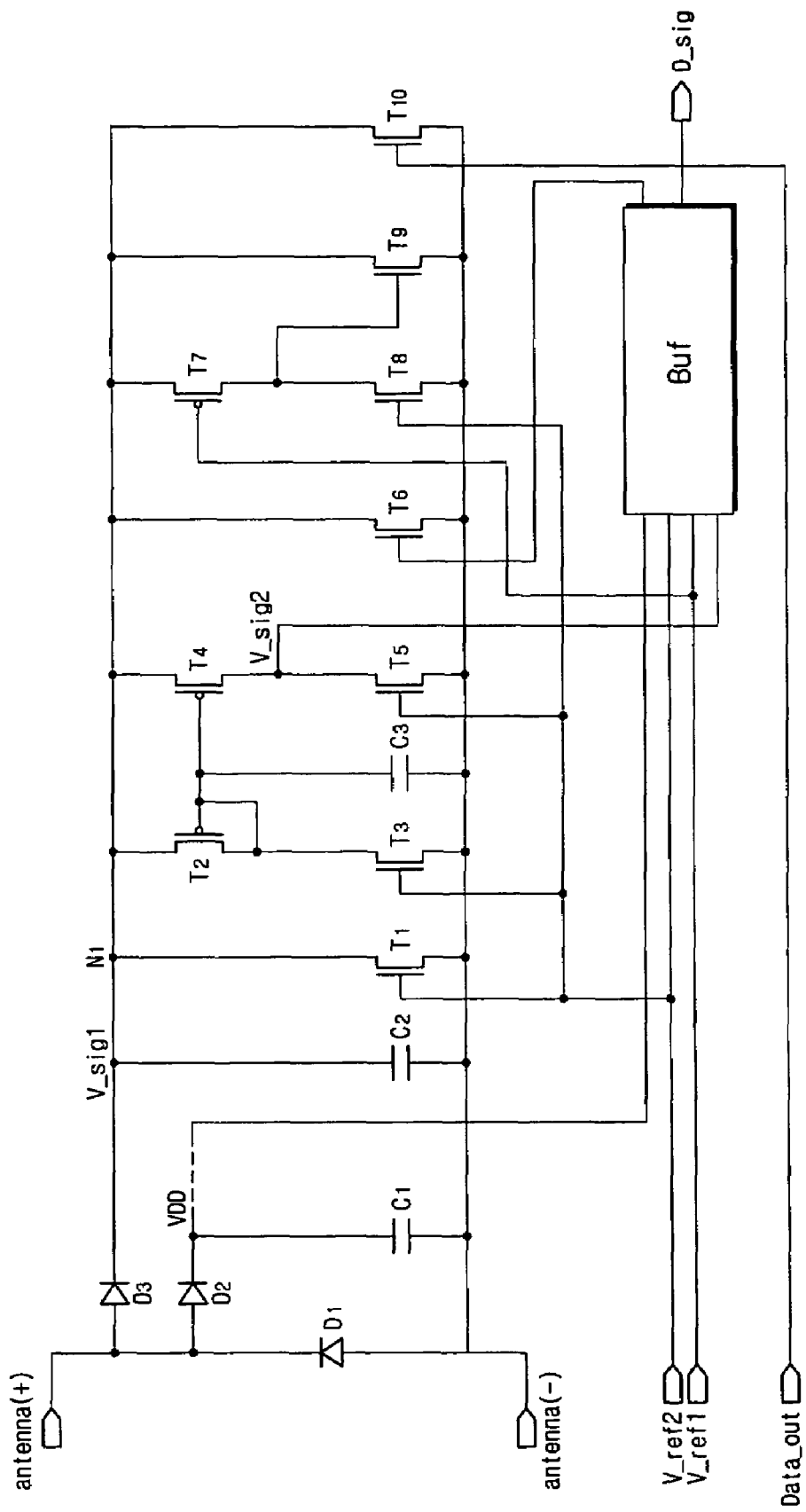
Figure 8:
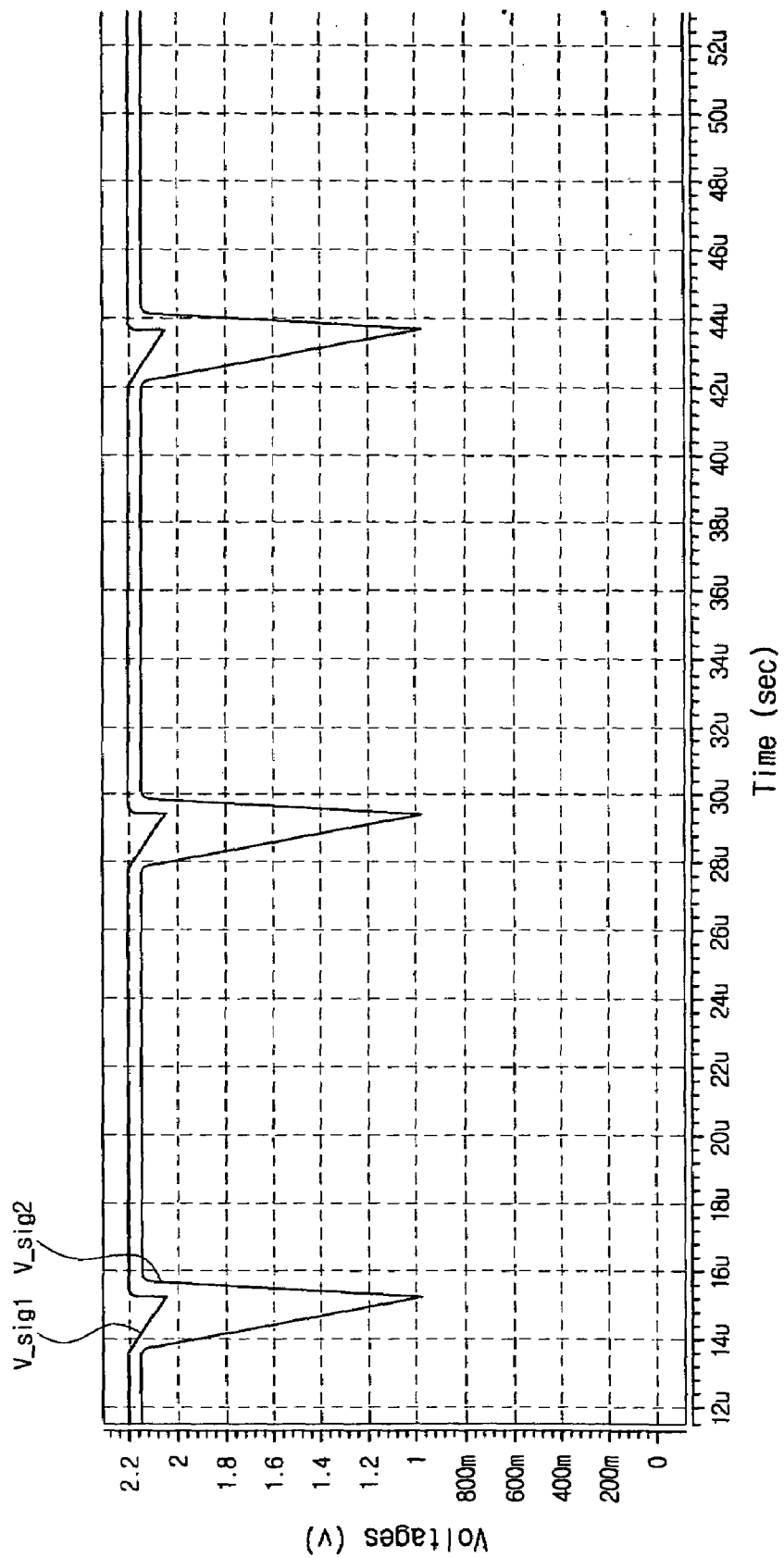
Figure 9:
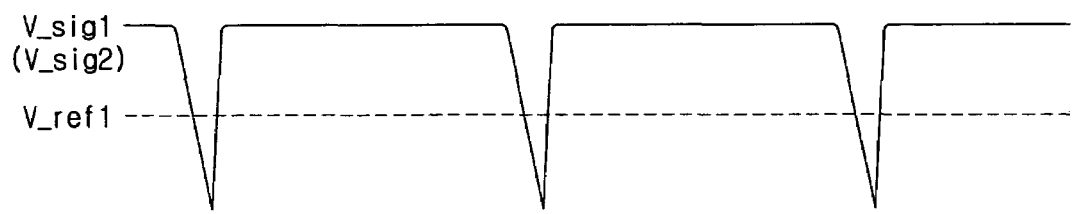
Figure 10:
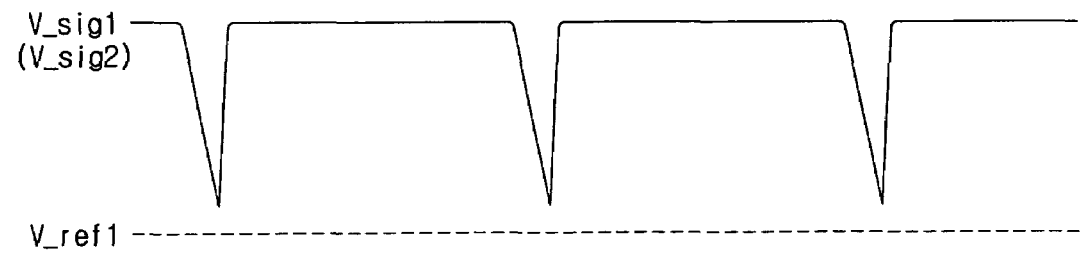

FIG. 3 a schematic block diagram illustrating a signal converter according to an exemplary embodiment of the present invention;

FIG. 4 is a circuit diagram illustrating an example of the signal converter of FIG. 3;

FIG. 5 is a graph illustrating waveforms output from a signal converter according to an exemplary embodiment of the present invention and a signal converter according a comparison example;

FIG. 6 is a flow chart describing a method of driving an RFID tag according to an exemplary embodiment of the present invention;

FIG. 7 is a circuit diagram illustrating a signal converter according to a comparison example;

FIG. 8 is a graph illustrating a waveform output from a signal converter of FIG. 7;

FIG. 9 is a view describing a signal converting method using the output waveform of FIG. 8; and FIG. 10 is another view describing a signal converting method using the output waveform of FIG. 8.

DETAILED DESCRIPTION OF THE EXEMPLARY EMBODIMENTS

Certain non-limiting exemplary embodiments of the present invention will be described in greater detail with reference to the accompanying drawings.

Figure 1:
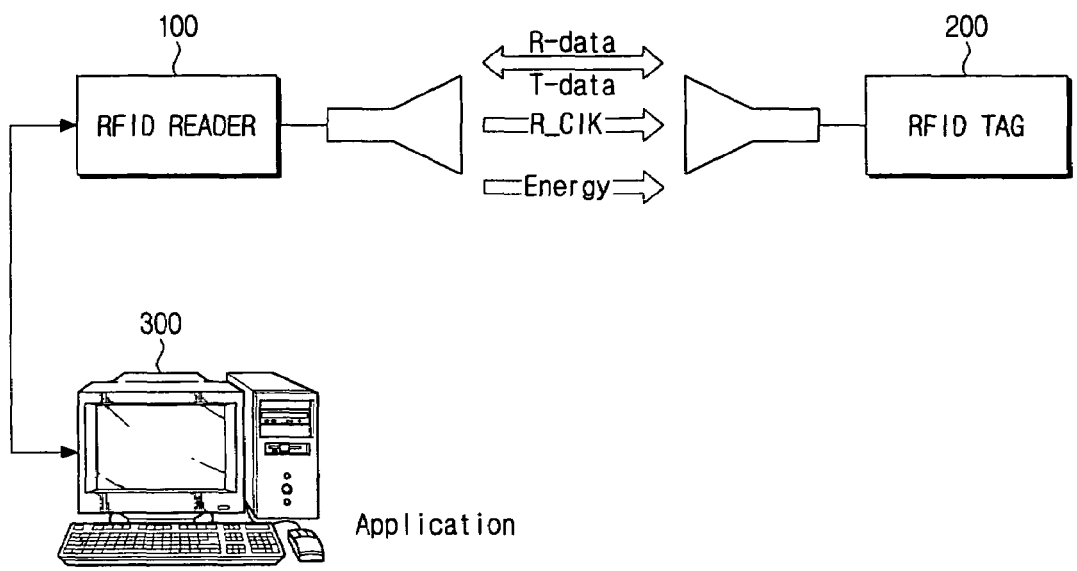
FIG. 1 is a schematic block diagram illustrating an information recognition system according to an exemplary embodiment of the present invention.

FIG. 1 is a schematic block diagram illustrating an information recognition system according to an exemplary embodiment of the present invention. Additionally, FIG. 1 illustrates an RFID system of an information recognition system.

Referring to FIG. 1, an radio frequency identification (RFID) system 10 according to an exemplary embodiment of the present invention includes an RFID reader 100 and an RFID tag 200.

More specifically, the RFID reader 100 includes an antenna (not shown) for analog signals, and transmits and receives data to and from the RFID tag 200 using a radio frequency (RF).

The RFID tag 200 stores an identifier (ID) allocated to identify each RFID tag, and tag data.

If the RFID tag 200 is in a read range of the RFID reader 100 to recognize a magnetic field generated by the energy output from the RFID reader 100, in other words, if the RFID tag 200 is in a read range where the RFID reader 100 can recognize the RFID tag 200, the RFID tag 200 receives an analog signal from the RFID reader 100.

In response to the analog signal received from the RFID reader 100, the RFID tag 200 transmits the stored ID and tag data to the RFID reader 100. The RFID reader 100 then transmits the received ID and tag data to a host computer 300, and the host computer 300 stores them.

Figure 2:
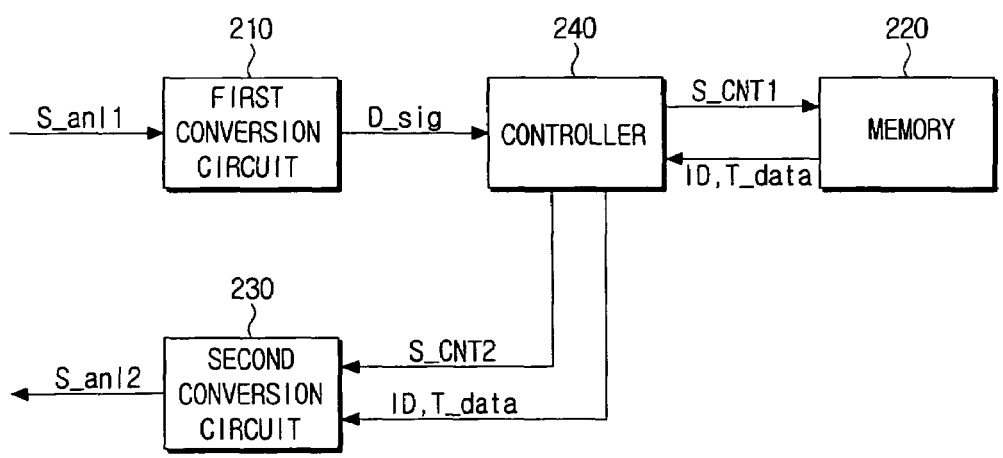
FIG. 2 is a schematic block diagram illustrating an RFID tag according to an exemplary embodiment of the present invention.

FIG. 2 is a schematic block diagram illustrating an RFID tag according to an exemplary embodiment of the present invention.

Referring to FIGS. 1 and 2, the RFID tag 200 according to an exemplary embodiment of the present invention includes a first conversion circuit 210, a memory 220, a second conversion circuit 230 and a controller 240.

More specifically, the first conversion circuit 210 is connected through a PAD to an antenna (not shown), which receives a first analog signal S_anl1 from the RFID reader 100, to receive the first analog signal S_anl1 output from the RFID reader 100. The first analog signal S_anl1 contains information on a reader clock R_clk and reader data R_data.

First, the antenna induces an alternating current (AC) signal in response to the first analog signal S_anl1 received from the RFID reader 100. The induced AC signal is transmitted to the first conversion circuit 210 and generates a power signal VDD which drives the RFID tag 200.

Additionally, the induced AC signal in the first conversion circuit 210 generates a first demodulation signal V_sig1 which oscillates in a predetermined potential range. The first demodulation signal V_sig1 includes information on the reader data R_data.

The first conversion circuit 210 is configured to amplify the first demodulation signal V_sig1 to a certain level.

Additionally, as the power signal VDD or the first demodulation signal V_sig1 includes a plurality of ripple voltages, the first conversion circuit 210 may further include a voltage stabilizer (not shown) to remove ripple voltages.

Furthermore, the first conversion circuit 210 includes a demodulation circuit which compares the first demodulation signal V_sig1 or the amplified the first demodulation signal V_sig1 with a reference signal V_ref received from the outside, and which converts and outputs the first demodulation signal V_sig1 into a digital signal D_sig.

The first conversion circuit 210 will be described in more detail through FIGS. 3 and 4.

The memory 220 stores the ID and the tag data T_data of the RFID tag 200. The memory 220 can be implemented with an electrically erasable and programmable read only memory (EEPROM) which can freely change the stored contents.

The second conversion circuit 230 includes a modulation circuit which converts the ID and tag data T_data stored in the memory 220 into a second analog signal S_anl2, and which outputs the second analog signal S_anl2 to the antenna.

The controller 240 receives the digital signal D_sig output from the first conversion circuit 210, checks the contents of the digital signal D_sig, and outputs a first control signal S_CNT1.

The memory 220 decodes and transmits the stored ID and tag data T_data in response to the first control signal S_CNT1. The controller 240 encodes the ID and the tag data T-data decoded and output from the memory 220, and outputs the data to the second conversion circuit 230.

The controller 240 also outputs a second control signal S_CNT2 to control the driving of the second conversion circuit 230.

Accordingly, the second conversion circuit 230 is driven in response to the second control signal S_CNT2 to modulate the encoded ID and tag data T_data and output the second analog signal S_anl2 over the antenna.

FIG. 3 is a schematic block diagram of a signal converter according to an exemplary embodiment of the present invention. The signal converter as in FIG. 3 is the first conversion circuit 210 as in FIG. 2. Thus, the corresponding parts will be referred to by the same reference numerals and symbols.

FIG. 4 is a circuit diagram illustrating an example of the signal converter of FIG. 3, and FIG. 5 is a graph illustrating waveforms output from a signal converter according to an exemplary embodiment of the present invention and a signal converter according a comparison example.

Referring to FIGS. 3 and 4, the signal converter according to an exemplary embodiment of the present invention may include a first signal converter 211, a second signal converter 212, a signal detector 213, a signal amplifier 214 and a logic signal generator 215.

More specifically, the first signal converter 211, as explained with reference to FIG. 2, receives an AC signal, and rectifies and smoothes the received signal to convert into a power signal VDD. To this end, the first signal converter 211 may include a first rectifier 211a and a first smoothing circuit 211b.

The first rectifier 211a may include a first and a second diodes D1, D2 to rectify AC signal, and the first smoothing circuit 211b may include a first capacitor C1 of a predetermined capacitance to smooth and convert the rectified signal into power signal VDD. The first and the second diodes D1, D2 may be implemented with schottky diodes.

The second signal converter 212, as explained with reference to FIG. 2, receives AC signal, and rectifies and smoothes the AC signal into a first demodulation signal V_sig1 oscillating in a predetermined range of potential. To this end, the second signal converter 212 may includes a second rectifier 212a and a second smooth circuit 212b.

The second rectifier 212a may include a first and a third diodes D1, D3 to rectify AC signal, and the second smooth circuit 212b may include a second capacitor C2 of a predetermined capacitance to smooth and convert the rectified signal into a first demodulation signal V_sig1. The third diode D3 may be implemented with a schottky diode.

The second capacitor C2 of the second smooth circuit 212b may have relatively smaller capacitance than the first capacitor C1 of the first smooth circuit 211b.

Accordingly, the power signal VDD and the first demodulation signal V_sig1 from the same AC signal may have different degrees of smoothing, and different peak-to-peak values. As a result, the output from the first converter 211 which has a relatively higher degree of smoothing, is used as power signal VDD, while the output from the second signal converter 212 which has a relatively lower degree of smoothing, is used for recovery of reader data R_data.

The signal detector 213 is used to resolve the problems associated with the use of low radio frequency RF and subsequent need to increase the capacitance of the second capacitor C2, such as increase of current leakage from the first transistor Tr1, and small peak-to-peak value of the first demodulation signal V_sig1 of the first node N1.

More specifically, the leakage current from the first transistor Tr1 to the ground terminal GND increases and the level of voltage to the first node N1 decreases when low radio frequency is used. Therefore, the signal detector 213 operates to detect and amplify the first demodulation signal V_sig1 supplied to the first node N1.

To this end, the signal detector 213 may include second through fifth transistors Tr2~Tr5, and a third capacitor C3. The second and the fourth transistors TR2, Tr4 may be connected in series with the third and the fifth transistors Tr3, Tr5. Additionally, the second transistor Tr2 may be formed to have a diode connection, and the gate terminal of the second transistor Tr2 is connected with the gate terminal of the fourth transistor Tr4 to form a current mirror configuration.

First, the second node N2 has a certain charge by the electric charge of the third capacitor C3, and gate-source voltage Vgs of the second and the fourth transistors Tr2, Tr4 varies according to the variation of electric charge of the first demodulation signal V_sig1 supplied to the first node N1.

According to the current mirror structure of the signal detector 213, a predetermined level of amplified current Ids2, which is amplified by the current Ids1 flowed past the second transistor Tr2, flows the third node N3 when the second and the fourth transistors Tr2, Tr4 are activated according to the variation of the gate-source voltage Vgs.

Therefore, a predetermined level of amplified, constant current is obtained by adjusting the channel width of the fourth transistor Tr4 by general operation of the amplifier of current mirror structure.

For example, the output current Ids2 of the third node N3 can be twice as large as the current Ids1 flowing the second transistor Tr2 when W/L of the fourth transistor Tr4 is made twice as large as the second transistor Tr2.

Accordingly, a second demodulation signal V_sig2, which is amplified from the first demodulation signal V_sig1 to a predetermined level by the amplified constant current Ids2, is output from the third node N3.

The signal amplifier 214 receives the second demodulation signal V_sig2 from the signal detector 213, amplifies the second demodulation signal V_sig2 to a predetermined level and outputs the resultant signal. To this end, the signal amplifier 214 may include a current mirror differential amplifier having sixth through ninth transistors Tr6~Tr9.

The signal amplifier 214 may additionally include a secondary amplifier having eleventh to fourteenth transistors Tr11~Tr14 to further increase the output gains of the current mirror differential amplifier.

The sixth and the seventh transistors Tr6, Tr7 may be connected in series with the ninth and the tenth transistors Tr9, Tr10, respectively, and these are connected in parallel with the eighth transistor Tr8. The gate terminal of the seventh transistor Tr7 is connected with the third node N3 such that the second demodulation signal V_sig2 is received from the signal detector 213, and the gate terminal of the tenth transistor Tr10 is connected with the second node N2.

The sixth transistor Tr6 may be formed to have a diode connection structure, and the gate terminal of the sixth transistor Tr6 may be connected with the gate terminal of the thirteenth transistor Tr13 in a current mirror configuration. The ninth transistor Tr9 may be formed to have a diode connection structure, and the gate terminal of the ninth transistor Tr9 may be connected with the gate terminal of the eleventh transistor Tr11 to form a current mirror configuration.

First, the degree of turn-on of the seventh transistor Tr7 varies according to the variation of electric potential of the second demodulation signal V_sig2 output from the third node N3. The current Ids3 flowing the seventh transistor Tr7 increases when the level of the second demodulation signal V_sig2 is greater than the current of the second node N2 which is connected with the gate terminal of the tenth transistor Tr10. According to the increase of current Ids3 flowing the seventh transistor Tr7, the current Ids4 flowing the tenth transistor Tr10 is decreased to be lower than average so that constant current can flow a certain constant current source such as the eighth transistor Tr8 for example. As a result, voltage output to the fourth node N4 increases.

As explained above, the current Ids5 flowing the thirteenth transistor Tr13, which is connected with the sixth transistor Tr6 in the current mirror configuration, increases in proportion to the current Ids3 flowing the sixth transistor Tr6. Accordingly, the current flowing the twelfth transistor Tr12, which is formed in current mirror configuration with the fourteenth transistor Tr14, increases to increase the output voltage of the fifth node N5.

Likewise, current Ids6 flowing the eleventh transistor Tr11, which is connected with the ninth transistor Tr9 in current mirror configuration, is increased according to the increase of voltage output of the fourth node N4, so that electric charge of the fifth node N5 is further increased. This is clearly understandable with reference to FIG. 5.

Referring to FIGS. 4 and 5, output voltage of the signal converter 210 is determined such that, if the first demodulation signal V_sig1 is supplied to the first node N1 with a peak-to-peak value ranging approximately from 2.0V to 2.2V, the signal is amplified and output as the second demodulation signal NV_sig2 with a peak-to-peak value ranging approximately from 0V to 2.2V.

Accordingly, the signal converter 210 of the exemplary embodiment of the present invention outputs a second demodulation signal NV_sig2 of a peak-to-peak value in a wider range than the second demodulation signal OV_sig2 of the conventional signal converter shown in FIG. 7 which has a peak-to-peak value ranging approximately from 1V to 2.2V.

In other words, the charge of the reference signal V_ref1 is selected from an extended range. Therefore, a wider driving margin is provided for the same reference signal V_ref1.

As a result, more accurate determination can be made as to whether the second demodulation signal V_sig2 is greater or smaller than the reference signal V_ref1 by comparison because the second demodulation signal V_sig2 having an amplified peak-to-peak range is compared with the reference signal V_ref1.

NV_sig2 and OV_sig2 of FIG. 5 indicate the second demodulation signals, which are substantially same as the second demodulation signal indicated by V_sig2 of the present invention and the comparative example.

Referring back to FIGS. 3 and 4, the logic signal generator 215 is driven in response to the power signal VDD outputted from the first signal converter 211, and converts the second demodulation signal V_sig2 into a digital signal D_sig, when the demodulation signal V_sig2 is amplified in the signal amplifier 214 based on the externally-supplied reference signal V_ref1, and outputted from the fifth node N5.

For example, when the value of the amplified second demodulation signal V_sig2 is greater than the reference signal V_ref1, a digital signal of logic value "1" is generated. When the value of the amplified second demodulation signal V_sig2 is lower than the reference signal V_ref1, a digital signal of logic value "0" is generated. Accordingly, AC signal is converted into digital signal and supplied to the controller 240 as shown in FIG. 2. To this end, the logic signal generator 215 may include a buffer in series connection with a plurality of inverters.

The second demodulation signal V_sig2 outputted from the signal amplifier 214 has a relatively wider range of peak-to-peak value than that of the second demodulation signal V_sig2 before the amplification. Accordingly, the possibility that the externally-supplied reference signal V_ref1 is included in the peak-to-peak range increases, and the possibility that the logic signal generator 215 will recognize the logic value "0" or "1" also increases. As a result, driving margin of the signal converting apparatus is improved.

According to one aspect of the present invention, a over-voltage preventive part 216 may also be provided to protect internal elements of the RFID tag 200 when a rectified first demodulation signal V_sig1 is supplied with over-voltage into the RFID tag 200. The over-voltage preventive part 216 may include fifteenth to eighteenth transistors Tr15~Tr18 which are driven in response to a control signal CNT outputted from the logic signal generator 215, and an externally-supplied reference signal V_ref1. Additionally, an impedance matching part 217, including a nineteenth transistor Tr19, may also be provided to match impedance with the RFID reader 100.

The over-voltage preventive part 216 may be activated to discharge the first demodulates signal V_sig1 to the ground GND terminal when the first demodulation signal V_sig1 is supplied in over-voltage exceeding a predetermined level.

A signal V-ref2 is for biasing the transistors. The signals V_ref1, Vref2 may be outputted from the controller 240 as shown in FIG. 2.

FIG. 6 is a flowchart illustrating the method of driving RFID tag according to an exemplary embodiment of the present invention.

Referring to FIGS. 2 through 6, the method of driving RFID tag according to one exemplary embodiment may include generating a power signal and a first demodulation signal by rectifying and smoothing a first incoming analog signal (S100), amplifying the first demodulation signal to output a second demodulation signal and amplifying the second demodulation signal such that an externally-supplied reference signal is included in a peak-to-peak range of the second demodulation signal (S110), and converting the second demodulation signal into a digital signal in response to the power signal (S120).

The method of driving RFID tag according to the exemplary embodiment of the present invention may additionally include decoding and reading pre-stored tag data in response to the digital signal (S130), encoding the read tag data (S140, and modulating the encoded tag data and outputting a second analog signal (S150).

In S100, the first incoming analog signal S_anl1 is converted into a power signal VDD in the first signal converter 211, and the first analog signal S_anl1 is converted into a first demodulation signal V_sig1 in the second signal converter 212.

In S110, the first demodulation signal V_sig1 outputted from the second signal converter 212 is detected and amplified in the signal detector 213 and converted and outputted as a second demodulation signal V_sig2. The second demodulation signal V_sig2 is again amplified in the signal amplifier 214 such that the value of an externally-supplied reference signal V_ref1 is included in a peak-to-peak range of the amplified, second demodulation signal V_sig2 and then outputted.

In S120, the logic signal generator 215 compares the value of the reference signal V_ref1 with the amplified second demodulation signal V_sig2 such that the logic signal generator 215 outputs a logic value "1" when the value of the second demodulation signal V_sig2 is greater than that of the reference signal V_ref1, and outputs a logic value "0" when the value of the second demodulation signal V_sig2 is smaller than the reference signal V_ref1. As a result, the first analog signal S_anl1 inputted from the RFID reader 100 (FIG. 1) is converted into a digital signal D_sig and outputted.

In S130, the controller 240 transmits a first control signal S_CNT1 to the memory 220 in response to the digital signal D_sig outputted from the logic signal generator 215 so that ID or tag data T_data stored in the memory 220 is decoded and read out.

In S140, the controller 240 encodes the decoded tag data T_data and transmits the data to the second conversion circuit 230, and outputs a second control signal S_CNT2 to transmit the encoded tag data T_data to the RFID reader 100 as shown in FIG. 1.

In S150, the second conversion circuit 230 modulates the encoded tag data T_data in response to the second control signal S_CNT2 and outputs a second analog signal S_anl2 to the RFID reader 100.

According to the exemplary embodiments of the present invention explained above, a rectified and smoothed analog signal is amplified in the demodulation of an analog signal such that a margin is improved for the reference signal, which is to convert analog signal into digital signal, to be included in a peak-to-peak range of the rectified and smoothed analog signal. As a result, stable conversion from analog signal into digital signal is provided, and the rate of recognition of RFID tag is also improved.

While the invention has been shown and described with reference to certain embodiments thereof, it will be understood by those skilled in the art that various changes in form and details may be made therein without departing from the spirit and scope of the invention as defined by the appended claims.

What is claimed is:

1. A signal converter, comprising:
a first signal converter which converts an incoming analog signal into a power signal;
a second signal converter which converts the analog signal into a first demodulation signal;
a signal amplifier which amplifies the first demodulation signal to output a second demodulation signal such that a value of an externally-supplied reference signal is included in a peak-to-peak range of the second demodulation signal; and
a logic signal generator which converts the second demodulation signal into a digital signal in response to the power signal.

2. The signal converter of claim 1, wherein the signal amplifier comprises a differential amplifier.

3. The signal converter of claim 2, wherein the signal amplifier further comprises a second amplifier which increases an output gain of the differential amplifier.

4. The signal converter of claim 1, further comprising a signal detector which detects and amplifies the first demodulation signal when the peak-to-peak range of the first demodulation signal is narrow.

5. The signal converter of claim 4, wherein the signal amplifier outputs the first demodulation signal, which is amplified at the signal detector, as a second demodulation signal.

6. The signal converter of claim 1, further comprising an over-voltage preventive part which discharges the first demodulation signal to a ground terminal when the first demodulation signal outputted from the second signal converter is in an over-voltage exceeding a predetermined level.

7. The signal converter of claim 1, further comprising an impedance matching part which matches impedance with an output source of the analog signal.

8. The signal converter of claim 1, wherein the first signal converter comprises:
a first rectifier which rectifies the analog signal; and
a first smoothing circuit which converts by smoothing the rectified analog signal into the power signal.

9. The signal converter of claim 8, wherein the second signal converter comprises:
a second rectifier which rectifies the analog signal; and
a second smoothing circuit which converts by smoothing the rectified analog signal into the first demodulation signal.

10. The signal converter of claim 9, wherein the first smoothing circuit comprises a capacitor which has a capacitance relatively larger than that of the second smoothing circuit.

11. The signal converter of claim 1, wherein the logic signal generator comprises buffers in series connection with a plurality of inverters.

12. A radio frequency identification (RFID) tag, comprising:
a first conversion circuit which converts a first incoming analog signal into a power signal and a demodulation signal, amplifies the demodulation signal such that a value of a predetermined reference signal is included in a peak-to-peak range of the demodulation signal, and outputs a digital signal using the amplified demodulation signal;
a memory which stores tag data;
a second conversion circuit which converts the tag data into a second analog signal and outputs the converted signal; and
a controller which reads out tag data from the memory in response to the digital signal and controls the operation of the second conversion circuit in response to the read tag data.

13. The RFID tag of claim 12, wherein the first conversion circuit comprises:
a first signal converter which converts the first analog signal into a power signal;
a second signal converter which converts the first analog signal into a first demodulation signal;
a signal amplifier which amplifies the first demodulation signal to output a second demodulation signal such that a value of an externally-supplied reference signal is included in a peak-to-peak range of the second demodulation signal; and
a logic signal generator which converts the second demodulation signal into a digital signal in response to the power signal.

14. The RFID tag of claim 12, wherein the second signal converter comprises a modulation circuit which modulates the data signal into a second analog signal.

15. A method of driving a radio frequency identification (RFID) tag, comprising:
rectifying and smoothing a first incoming analog signal to generate a power signal and a first demodulation signal;
amplifying the first demodulation signal to output a second demodulation signal such that a value of an externally-supplied reference signal is included in a peak-to-peak range of the second demodulation signal; and
converting the second demodulation signal into a digital signal in response to the power signal.

16. The method of claim 15, further comprising:
decoding and reading out pre-stored tag data in response to the digital signal;
encoding the read tag data; and
modulating the encoded tag data to output a second analog signal.

* * * * *